Dec. 28, 1965     C. W. SKARSTROM ET AL     3,225,518
CLOSED SYSTEM HEATLESS DRYER
Original Filed June 16, 1960
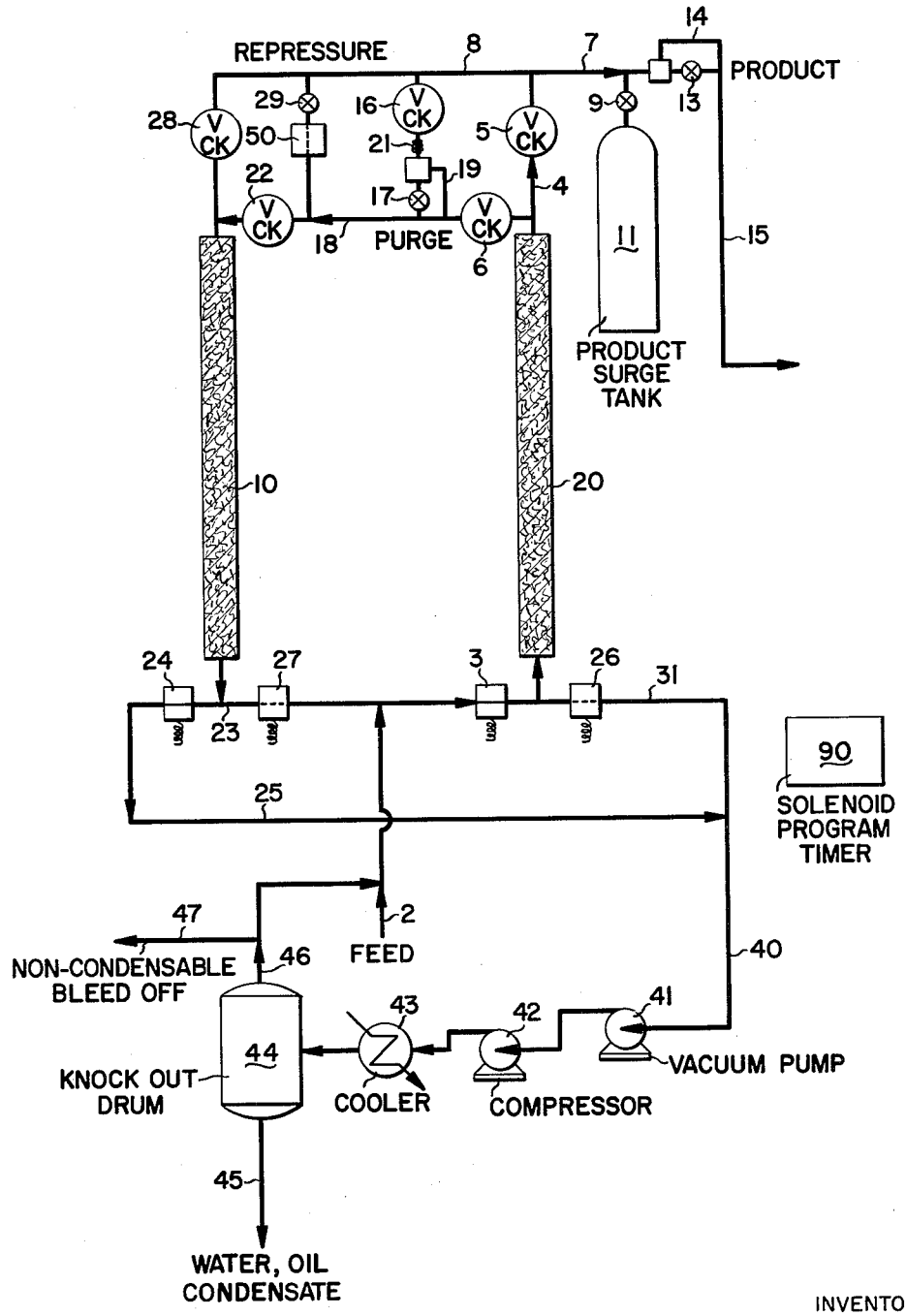
INVENTORS
CHARLES W. SKARSTROM
BRUCE R. TEGGE
By *W. O. Heilman*
Patent Attorney

# United States Patent Office 3,225,518
Patented Dec. 28, 1965

3,225,518
CLOSED SYSTEM HEATLESS DRYER
Charles W. Skarstrom, Montvale, and Bruce R. Tegge, Madison, N.J., assignors to Esso Research and Engineering Company, a corporation of Delaware
Continuation of application Ser. No. 36,640, June 16, 1960. This application June 10, 1964, Ser. No. 376,293
5 Claims. (Cl. 55—33)

The present invention is a continuation of Serial No. 36,640, filed June 16, 1960, now abandoned, and an improvement and adaptation of the process and apparatus described in Serial No. 21,702, filed April 12, 1960, (now Patent No. 3,101,261, issued August 20, 1963), entitled "Process for the Recovery of Hydrogen from Hydrocarbon Gas Streams," inventor—Charles W. Skarstrom.

The invention is specifically concerned with the drying of gas streams. It its broadest scope, the invention is concerned with an improved method for fractionating gaseous mixtures.

The improvement with respect to the apparatus and process described in application Serial No. 21,702 comprise both processing principles and apparatus features. In essence, the present invention comprises the further treatment of the effluent gas so as to remove undesirable constituents therefrom. The gas from which the undesirable constituents are removed is then preferably recycled through the system with the feed. The present invention is particularly desirable for drying valuable inert gases, such as oxygen, nitrogen, helium, hydrogen and the like, and also for removing trace impurities from these gases.

The present invention may be more fully understood by the description of one specific method of operating shown in the drawing. Referring specifically to the drawing, the feed gas is introduced into zone 10 by means of line 2. This feed gas comprising moisture passes through an open solenoid operated valve 3 and is introduced into the bottom of zone 20. Both zones 10 and 20 are packed with silica gel or other suitable adsorbents. Substantially dry gas is removed from the top of zone 20 by means of line 4. The dry gas flows through check valve 5 and cannot pass through valve 6. The gas then is divided into two streams. A portion of the gas passes through line 8 while the remainder passes through line 7. The portion of the dry gas passing through line 7 passes through valve 9 and is introduced into a product surge tank 11. The remainder of the dry gas in line 7 passes through valve 13, the rate of which is adjusted by a flow controller 14 which maintains predetermined pressure differential across the valve. Product dry gas is withdrawn by means of line 15.

That portion of the gas removed by means of line 8 is passed through check valve 16 through valve 17 and then into the top of zone 10 by means of valve 22 and line 18. The rate of flow through valve 17 is maintained at the desired rate by flow controller 19 which maintains the desired pressure drop across valve 17. In addition, valve 16 is spring loaded by means of spring 21 so as to only open after predetermined pressure drop occurs across valve 16.

The dry gas removed through line 18 passes through check valve 22 and into the top of zone 10 where it backwashes downwardly through the bed. Bed 10 is maintained at a predetermined pressure below the pressure existing in adsorption zone 20. The dry gas together with desorbed constituents is removed from the bottom of zone 10 through line 23. This stream passes through solenoid operated valve 24 through line 25 and is further processed as hereinafter described. Thus, when zone 20 is on adsorption and zone 10 on desorption valves 3, 5, 9, 13, 16, 17, 22 and 24 are open, whereas, valves 26, 27, 6, 28 and 29 are closed. At the end of the cycle when valve 24 closes, valve 29 opens until zone 10 reaches the predetermined high pressure. At this point valve 27 opens and valve 3 closes.

The cycle is then continued as hereinbefore described wherein zone 10 is on adsorption and zone 20 is on desorption. A portion of the product dry gas flowing through valve 28 is used to backwash zone 20, a portion is used to repressure surge tank 11, and the remainder is passed through line 15 as product gas. The dry gas and desorbed components from zone 20 are passed through open valve 26, through line 31, and are handled as hereinafter described.

In essence, the apparatus described in the figure comprises two adsorbent beds which are alternately connected to the high pressure feed. While one bed is at high pressure the other bed is dumped to the low pressure, backwashed with some of the dry product through a flow control valve and brought back up to line pressure with dry product at the product end. These valves may comprise five 2-way electric solenoid valves. These on-off valves are operated and programmed from a multicam recycling electric timer 90 (wiring not shown). The use of two on-off feed and two on-off dump valves allows the low pressure bed to be repressured before the other bed is dumped. This insures continuity in the product pressure and flow.

That portion of the dry gas backwashed and the desorbed constituents are passed through line 40 by means of a vacuum pump 41 or equivalent. These gases are compressed in compressor 42, cooled in cooler 43 in order to condense out the moisture. The stream is passed to a knockout or equivalent zone 44 wherein the moisture is removed by means of line 45. The gases free of adsorbed constituents are removed overhead from zone 44 by means of line 46 and are preferably recombined with the feed. Under certain conditions, it may be desirable to bleed off a portion of these gases by means of line 47.

With respect to the figure it has also been found that the repressuring downward with the pure product gas has two desirable features, namely, mechanical and process, as follows. (1) Mechanical. Inrushing gases from above tend to keep the spring loaded bed of particles well packed. This makes movement with consequent attrition of the particles negligible. (2) Process improvement. Repressuring with pure product gas instead of feed eliminates the very fast inflow of feed. When repressuring with feed, the high space velocity of the incoming gas causes the fronts of the adsorbing components to be moved an excessive amount toward the product end. By recharging with product from the other bed which is at high pressure, the increased feed space velocity to provide this extra demand for feed gas is kept at a minimum. It is further minimized by a product surge tank, hereinafter described.

To accomplish repressuring with the product, an on-off electric solenoid valve 50 is installed to bypass the purge flow control 17. The program timer is adjusted so that the instant a dump valve 24 closes on the low pressure bed 10, etc., the repressuring valve opens. This allows pure product to fill that bed to the full line pressure. A throttling valve 29 allows the rate of repressuring to be adjusted as desired. After the bed 10 has reached full line pressure, its feed valve 27 is opened. Simultaneously, the feed valve 3 to the spent bed is shut. Finally, both the dump valve 26 to the spent bed opens and the repressuring valve 50 shuts off. The spent bed dumps to the low pressure and its purge with pure product commences.

Another desirable feature of the apparatus and process of the figure is the spring loaded check 21 in the purge line. In order to derive the maximum benefit of the pure product used as purge, the purge flow is delayed until the spent bed has nearly reached its lowest pressure. The purge flow then begins. The purge is thus used at maximum expanded volume. This is accomplished by use of a spring loaded check valve 16 (relief valve) ahead of the purge flow controller 17.

Depending upon the operation contemplated, the adsorbent employed may be selected from such materials as activated carbon, alumina, silica gel, glass wool, and adsorbent cotton. Various metal oxides, clays, fuller's earth, bone char, etc. also have adsorbent characteristics which may be utilized according to the present invention. Still another adsorbent material of the character contemplated is one known as Mobilbeads, which is a siliceous moisture adsorbing compound.

Other adsorbent materials suitable for employment according to the present invention include materials known as molecular sieves. This class of materials includes certain zeolites, both naturally-occurring and synthetic, which have crystalline structures containing a large number of small cavities interconnected by a number of still smaller holes or pores, the latter being of exceptional uniform size. The pores may vary in diameter from 3 to 5 Angstrom units to 12 to 15 or more. For a particular molecular sieve material, however, the pore sizes are substantially uniform and accordingly the material normally will be designated by the characteristic size of its pores.

As pointed out heretofore, the present invention is concerned primarily with the closed system wherein the secondary effluent containing the adsorbed constituents is handled in a specific manner. It is particularly adapted for the removal of moisture from relatively valuable gases or when the gas being dried is noxious. In essence, the dumps and back purge are collected and recompressed by a vacuum and pressure pump. These compressors must be able to pump the gas to a pressure at least as high as the high pressure wet gas feed. After recompression, the purge gas is cooled and water, oil and any other condensate are trapped in a cool knockout drum. The liquids are bled off for disposal via a float valve. A gas bleed-off is provided to vent the accumulated concentration of noncondensable vapors which have been caught on the adsorbent beds and rejected during the purge. These vapors, for example, may be $CO_2$, CO, hydrocarbon gases, odors, alcohol, ammonia, $SO_2$, $SO_3$, $H_2S$, smog, and other contaminants of feed. The recompressed purge gas then joins the high pressure feed to be processed again.

Instead of mixing the recompressed purge gas into the feed, it may be removed entirely from the system through the heavy end bleed-off line to a fuel line. As another alternate, the recompressed purge gas can be recycled to a chemical process which is removing the contaminants at high levels, but through which trace contaminants pass. Thus, this heatless dryer can be made to complement chemical treating processes. The latter can be worked harder with more contaminant carry-over, relying on the heatless dryer for final clean-up. Other typical applications include: drying valuable inert gases such as oxygen, nitrogen, helium, hydrogen, etc. Also removing other trace impurities in these gases; drying refrigerants such as the freons, ammonia, $SO_2$, etc.; drying methyl chloride for use in butyl rubber manufacture; removing water, acetylene and $C_3+$ from ethylene for polyethylene manufacture; removing water, $H_2S$, $CO_2$, and $C_4+$ from natural gas.

What is claimed is:
1. A process for the separation of a component from a gaseous mixture utilizing two adsorbent beds, said process comprising the steps of flowing a feed stream of gaseous mixture including said component through a first bed of adsorbent initially relatively free of said component at a preselected initial relatively high pressure and in a positive flow direction in an initial cycle, said adsorbent being preferentially selective for said component; discharging a gaseous stream from said first bed as a primary effluent; segregating a portion of said primary effluent as a product stream; passing the remainder of said primary effluent in a reverse flow direction through a second bed of adsorbent at a relatively low pressure, which adsorbent is relatively saturated with said component at the start of said initial cycle, whereby as said cycle continues, said first bed becomes relatively saturated with said component progressively in said positive direction and whereby said second bed becomes relatively free from said component in said reverse direction; continuing said initial cycle for a time period less than that required to secure saturation of said first bed and that required to secure freedom from said component of said second bed; discharging a gaseous stream from said second bed as a secondary effluent, said secondary effluent containing at least a portion of said remainder of primary effluent and desorbed component; compressing at least a portion of said secondary effluent, thereby removing said desorbed component; reintroducing said compressed secondary effluent, depleted in said desorbed component, into said feed stream; thereafter introducing said feed stream into said second bed in a positive flow direction at said initial relatively high pressure; discharging a gaseous stream from said second bed as a primary effluent; segregating a portion of said last-named primary effluent as a product stream; passing the remainder of said last-named primary effluent in reverse flow through said first bed of adsorbent at said relatively low pressure; discharging a gaseous stream from said first bed as a secondary effluent, said last-named secondary effluent containing at least a portion of said remainder of last-named primary effluent and desorbed component; compressing at least a portion of said last-named secondary effluent, thereby removing said last-named desorbed component; reintroducing said compressed, last-named secondary effluent, depleted in said last-named desorbed component, into said feed stream; and thereafter cyclically continuing said operation.

2. Process as defined by claim 1 wherein said secondary component is removed by compression and cooling of said effluent stream.

3. Process as defined by claim 1 wherein said component comprises moisture.

4. Process as defined by claim 3 wherein said adsorbent comprises silica gel, and wherein said gaseous feed comprises a gas selected from the group consisting of oxygen, nitrogen, helium and hydrogen.

5. Process as defined by claim 1 wherein said component comprises moisture, wherein said gaseous feed comprises methyl chloride and wherein said methyl chloride is subsequently processed in a butyl rubber manufacturing operation.

References Cited by the Examiner
UNITED STATES PATENTS 2,944,627  7/1960  Skarstrom _____ 55—33
3,082,166  3/1963  Skarstrom.

REUBEN FRIEDMAN, *Primary Examiner.*